(12) United States Patent
Kook et al.

(10) Patent No.: US 10,788,007 B2
(45) Date of Patent: Sep. 29, 2020

(54) METHOD FOR SAFELY CAPTURING HIGH RPM THRESHOLDS IN SPARK-IGNITION ENGINES

(71) Applicants: Eugene B. Kook, Little Rock, AR (US); Muriel M. Kook, Little Rock, AR (US)

(72) Inventors: Eugene B. Kook, Little Rock, AR (US); Muriel M. Kook, Little Rock, AR (US)

(*) Notice: Subject to any disclaimer, the term of this patent is extended or adjusted under 35 U.S.C. 154(b) by 108 days.

(21) Appl. No.: 16/041,761

(22) Filed: Jul. 21, 2018

(65) Prior Publication Data
US 2019/0024621 A1   Jan. 24, 2019

Related U.S. Application Data

(60) Provisional application No. 62/535,820, filed on Jul. 21, 2017.

(51) Int. Cl.
*F02P 11/02* (2006.01)
*F02P 9/00* (2006.01)
(Continued)

(52) U.S. Cl.
CPC ............ *F02P 11/02* (2013.01); *F02D 31/001* (2013.01); *F02D 41/0025* (2013.01);
(Continued)

(58) Field of Classification Search
CPC .. F02D 31/001; F02D 11/105; F02D 41/0025; F02D 41/2451; F02D 41/263;
(Continued)

(56) References Cited

U.S. PATENT DOCUMENTS 4,336,778 A   6/1982   Howard
4,408,583 A   10/1983  Merrick
(Continued)

OTHER PUBLICATIONS

Chalwyn Co. U.K., Instructions for Model CSX-300, publication# and date unknown, http://www.chalwyn.com/tenants/amot/documents/Datasheet_CSX_300_Series.pdf.
(Continued)

*Primary Examiner* — Sizo B Vilakazi
(74) *Attorney, Agent, or Firm* — Stephen D. Carver (57) ABSTRACT

A method for safely capturing an engine RPM threshold in a spark-ignition internal combustion engine which may exceed the maximum safe unloaded RPM for that engine. Typical engines having a safe RPM high speed redline when coupled to a load, and a reduced RPM redline when decoupled and unloaded, can be set to activate ancillary equipment at a high redline, engine loaded RPM by deriving and processing data from the engine at a low, unloaded reduced RPM speed. The method requires operator reference to an existing OEM or after-market tachometer which enables the user to set a low RPM reference point while the engine is unloaded and running at a slow RPM. Raw data from the latter low RPM reference point selected by a user is safely captured to form a raw threshold while the engine is operating unloaded, and a higher RPM operating threshold is calculated and set from the raw threshold. The higher RPM operating threshold may exceed the maximum safe unloaded RPM for said engine.

7 Claims, 7 Drawing Sheets

(51) Int. Cl.
*F02P 5/155* (2006.01)
*F02D 41/26* (2006.01)
*F02D 41/22* (2006.01)
*F02D 41/00* (2006.01)
*F02D 41/24* (2006.01)
*F02D 31/00* (2006.01)
*F02D 11/10* (2006.01)
*B60K 28/10* (2006.01)

(52) U.S. Cl.
CPC ....... *F02D 41/222* (2013.01); *F02D 41/2451* (2013.01); *F02D 41/263* (2013.01); *F02P 5/155* (2013.01); *F02P 9/002* (2013.01); *B60K 28/10* (2013.01); *B60W 2510/0638* (2013.01); *B60W 2540/16* (2013.01); *B60Y 2200/114* (2013.01); *F02D 11/105* (2013.01)

(58) Field of Classification Search
CPC ......... F02D 41/222; F02P 5/155; F02P 11/02; F02P 7/0775; F02P 9/002; F02P 3/04; B60W 2510/0638; B60W 2540/16; B60Y 2200/114; B60K 28/10
See application file for complete search history.

(56) References Cited

U.S. PATENT DOCUMENTS

| | | | |
|---|---|---|---|
| 4,683,843 A | | 8/1987 | Norcia et al. |
| 4,840,157 A | | 6/1989 | Furrow |
| 5,269,275 A | | 12/1993 | Dahlgren |
| 5,648,898 A | | 7/1997 | Moore-McKee et al. |
| 5,769,051 A | | 6/1998 | Bayron et al. |
| 5,905,374 A | | 5/1999 | Westberg et al. |
| 6,137,399 A | | 10/2000 | Westberg et al. |
| 6,339,743 B1 * | 1/2002 | Young | F02P 5/02 701/115 |
| 6,560,528 B1 * | 5/2003 | Gitlin | F02D 41/2422 123/406.62 |
| 7,012,514 B2 * | 3/2006 | Scholl | B60K 35/00 324/160 |
| 7,859,394 B1 * | 12/2010 | Richter | F16H 63/42 340/439 |
| 2011/0023822 A1 * | 2/2011 | Spivak | F02P 9/005 123/335 |

OTHER PUBLICATIONS

Classic Instruments, Instructions for Model SNLITE, pub# and date unknown http://www.classicinstruments.com/userfiles/files/Manuals/RPM%20Switch%20Installation%20Rev_12014.pdf.
Dedenbear Products Inc., Instructions for Model RPM2, publication# and date unknown, http://www.dedenbear.com/instructionswiring/RPM-2.pdf.
Dynatek, Instructions for Model DSM-2, publication# 2801160B, Jun. 8, 2004, http://www.powercommander.com/downloads/Support-Released/Dynatek/Manuals/DSMS-2.pdf.
Holley Performance Products Inc., Instructions for Model 840007, publication# 199R11210, Sep. 28, 2016, https://static.speedwaymotors.com/pdf/425840008.pdf.
Intellitronix, Instructions for Model N3012, publication# unknown, Jan. 2017, https://www.carid.com/images/intellitronix/items/pdf/n3012-installation-guide.pdf.
Intellitronix, Instructions for Model N3210, publication# unknown, Jan. 2017, https://static.summitracing.com/global/images/instructions/izl-n3210.pdf.
Jegs Performance Products, Instructions for Model 40822, publication# and date unknown, https://www.jegs.com/installationinstructions/500/555/555-40822.pdf.
Jegs Performance Products, Instructions for Model 40824, publication# and date unknown, https://www.jegs.com/InstallationInstructions/500/555/555-40824.pdf.
Jegs Performance Products, Instructions for Model 41262, publication# and date unknown, https://www.jegs.com/InstallationInstructions/500/555/555-41260_41261_41262.pdf.
Stack Ltd., Instructions for Model ST539, publication# ST541048 rev 002, pub date unknown, http://www.stackltd.com/st539_shiftlight.html.
Vdo, Instructions for Model 333-935, publication# unknown, Mar. 24, 2016, https://www.vdo-instruments.com/media/instructions/0%20515%20010%20444%20--%20Tachometer%20Installation%2.
Nitrous Oxide Systems Inc., Instructions for Model 15982, publication# 199R10482, Feb. 7, 2013, http://www.documents.holley.com/199r10482rev4.pdf.
Lingenfelter Performance Engineering, Instructions for Model RPM-003, publication# and date unknown, https://www.lingenfelter.com/PDFdownloads/L460160000.pdf.
Autotronic Controls Corp, Instructions for Model MSD 8956, publication# FRM24819, Mar. 2003, http://documents.msdperformance.com/8956.pdf.
Autotronic Controls Corp, Instructions for Model MSD 8963, publication# FRM29016, Nov. 2007, http://documents.msdperformance.com/8963.pdf.
Autotronic Controls Corp, Instructions for Model MSD 8969, publication# FRM28959, Aug. 2007, http://documents.msdperformance.com/8969.pdf.
Autotronic Controls Corp, Instructions for Model MSD 75591, publication# FRM29214, Jan. 2014, http://documents.msdperformance.com/75591.pdf.
Nitrous Express, Instructions for Model 18959, publication# and date unknown, http://www.nitrousexpress.com/oldwebdocs/instructions/tpswindowswitch.pdf.
Specialty Auto Parts USA, Instructions for Model Proform 67005, publication# unknown, 2014, https://static.summitracing.com/global/images/instructions/pro-67005c.pdf.
Specialty Auto Parts USA, Instructions for Model Proform 67007, publication# unknown, 2003, https://www.proformparts.com/images/ePIM/original/67007C_Instructions_2018.pdf.
Roda Deaco, Instructions for Model 1520-001, publication# IOM-1520-001, Nov. 10, 2014, http://www.rodadeaco.com/tenants/rodadeaco/documents/IOM-Revguard2-1114-Rev6.pdf.
Shifnoid Ltd., Instructions for Model NCRPM3000, publication# unknown, 2011, http://www.shifnoid.com/pdf/2010/NCRPM3000.pdf.
Auto Meter Products Inc., Instructions for Model 2302, publication# 2650-468H, Dec. 5, 2001, https://www.autometer.com/media/manual/2650-468X.pdf.
Auto Meter Products Inc., Instructions for Model 3960, publication# 2650-1166-00, Jul. 10, 2006, https://www.autometer.com/media/manual/2650-1166.pdf.
Auto Meter Products Inc., Instructions for Model 3906, publication# 2650-1244-00, Mar. 30, 2009, https://www.autometer.com/media/manual/2650-1244.pdf.
Auto Meter Products Inc., Instructions for Model 5321, publication# 2650-1513-00, Jun. 23, 2010, https://www.autometer.com/media/manual/2650-1513.pdf.
Auto Meter Products Inc., Instructions for Model 5340, publication# 2650-397F, Aug. 17, 1999, http://www.donssport.com/Instructions/ATM/2650-397X-10.pdf.
Auto Meter Products Inc., Instructions for Model 6187, publication# 2650-1123-00, Dec. 18, 2007, http://www.donssport.com/Instructions/ATM/2650-1123-00.pdf.
Auto Meter Products Inc., Instructions for Model 6999, publication# 2650-1222-00, Apr. 4, 2007, https://www.autometer.com/media/manual/2650-1222.pdf.
Auto Meter Products Inc., Instructions for Model 19215, publication# 2650-1207, Jan. 3, 2007, https://www.autometer.com/media/2650-1207.pdf.
Auto Meter Products Inc., Instructions for Model 19217, publication# 2650-766C, Sep. 23, 2003, http://procycle.autometer.com/pdf/19216_instruction.pdf.

(56) References Cited

OTHER PUBLICATIONS

Digital Delay Electronics Inc., Instructions for Biondo model DDI-1067, publication# and date unspecified, https://www.racedigitaldelay.com/pdfs/instr-eliterpmswitch.pdf.

* cited by examiner

```
50 ──   LKEY      EQU       0x5F              ; Value being aquired during Learn
        WLL1      EQU       0x66              ; RPM window turn-on limit MSB
        WLL0      EQU       0x67              ; RPM window turn-on limit LSB
        WLH1      EQU       0x68              ; RPM window redline limit MSB
        WLH0      EQU       0x69              ; RPM window redline limit LSB
        IN1       EQU       0x7A              ; 2-byte pulse width input register...
        IN0       EQU       0x7B              ; ...write-only for INT/T1, read-only for MAIN
        NEWKEY    EQU       0x7E              ; Incoming keypress, used by key handler

#DEFINE   iKNEW    KFLAGS,1 ; Indicates actionable key (new or repeat)
                  #DEFINE   iWHLRN   KFLAGS,6 ; Indicates window-high being learned 51 ──   LearnWH   ; Handler for WLH data capture
                  BSF       iWHLRN            ; Learning window high, flag it for LED handler
        LWHb      CALL      HouseKeep         ; Wait for T0 and do standard housekeeping
                  BTFSS     iKNEW             ; Skip if any key change
                  GOTO      LWHb              ; No change yet, wait
                  MOVF      NEWKEY,F          ; Change, set Z for new key
                  BTFSS     STATUS,Z          ; Skip if Z (keys released)
                  GOTO      LWHb              ; Wait indefinitely for all keys released
52 ──   LWHa      CALL      HouseKeep         ; Wait for T0 and do standard housekeeping
                  BTFSS     iKNEW             ; Skip if any key change
                  GOTO      LWHa              ; No change yet, wait
                  MOVF      LKEY,W
                  XORWF     NEWKEY,W          ; Change, Z set if press = WH learning key
                  BTFSS     STATUS,Z          ; Skip if so
                  GOTO      LWHa              ; Wait indefinitely for learning-key press
53 ──   Lwh       BCF       INTCON,GIE        ; Kill IRQs while capturing RPM value
                  MOVF      IN0,W
                  MOVWF     WLH0
                  MOVF      IN1,W
                  MOVWF     WLH1              ; Capture current tach reading to high window
                  BSF       INTCON,GIE        ; Reenable IRQs
54 ──             MOVF      WLH0,W
                  IORWF     WLH1,W            ; Set Z for the captured value
                  BTFSC     STATUS,Z          ; Skip if valid (non-Z)
                  GOTO      LWHk              ; New value=0, kill both parameters
                  BCF       STATUS,C          ; Clear C for rotation
                  RRF       WLH1,F
55 ──             RRF       WLH0,F            ; Divide by 2
                  BTFSS     STATUS,C          ; Skip if LSbit rotated out is set (round up)
                  GOTO      LWHc              ; No rounding, jump
                  INCFSZ    WLH0,F            ; Round up, inc LSbyte and skip if carry
                  SKIP                        ; incfsNz
                  INCF      WLH1,F            ; Carry, inc MSbyte
        LWHc      MOVF      WLL0,W
                  IORWF     WLL1,W            ; Set Z for Window-low value
56 ──             BTFSC     STATUS,Z          ; Skip if already learned (non-0)
                  GOTO      XLearn            ; Accept new WH value without checks, done as-is
                  CALL      HminusL           ; Both values non-0, do magnitude check
                  BTFSS     STATUS,C          ; Skip if invalid (C set)
                  GOTO      XLearn            ; Valid new value, done
        LWHk      CLRF      WLL0
57 ──             CLRF      WLL1              ; New WLH slower than WLL, throw out old WLL
                  CLRF      WLH0
                  CLRF      WLH1              ; New WLH slower than WLL, throw out new WLH
                                              ; Done, fall out
        XLearn    ; New data captured, await key release
                  CALL      HouseKeep         ; Wait for T0 and do standard housekeeping
                  BTFSS     iKNEW             ; Skip if any key change
58 ──             GOTO      XLearn            ; No change yet, do nothing else
                  MOVF      NEWKEY,F          ; Change, set Z for new key
                  BTFSS     STATUS,Z          ; Skip if Z (keys released)
                  GOTO      XLearn            ; Iterate till release
                  CALL      BuffWrite1        ; Write new data to 2nd-copy locations
59 ──             CALL      BuffWrite0        ; Write new data to 1st-copy locations
        Kill      GOTO      Kill              ; Lockup till WDT resets processor
```

Fig. 5B

METHOD FOR SAFELY CAPTURING HIGH RPM THRESHOLDS IN SPARK-IGNITION ENGINES

CROSS REFERENCE TO RELATED APPLICATION

This utility conversion patent application is based upon, and claims priority from, a Provisional Application Ser. No. 62/535,820, filed Jul. 21, 2017, entitled "Method for Safely Capturing High RPM Thresholds in Spark-Ignition Engines," by inventors Eugene B. Kook and Muriel M. Kook.

BACKGROUND OF THE INVENTION

1. Field of the Invention

This invention relates generally to the control and setup of certain automotive accessories used in conjunction with high performance motor sports such as drag racing. More particularly the invention relates to a method for setting desired RPM levels or shift points in high performance vehicles employing accessories with set-points, such as nitrous oxide injection systems.

2. Discussion of the Related Art

Diverse electronic control systems for modern internal combustion engines and associated equipment are well known in the art. Multiple microprocessors can control engine operating characteristics, and the engine response to its load. Modern "on board diagnostic" systems (i.e., "OBD" systems) monitor vehicle operation, and can report system failures or malfunctions through various diagnostic codes. Controllers installed as factory equipment are generally factory-programmed with all the constants and variable-handling characteristics needed, often communicating with adjunct controllers over a Controller Area Network (i.e., "CANbus") or other local LAN provided by the manufacturer.

The modern CANbus is a robust vehicle bus standard designed to allow microcontrollers and devices to communicate with each other in applications without a host computer. With add-on performance equipment or accessories such as shift lights or nitrous oxide injection (NOx) systems, communication with the CANbus or LAN becomes difficult.

While OBD-II CAN protocols are standardized by law, the internal CAN and LAN messaging that carries on the "dirty work" of running a vehicle varies widely by manufacturer. Designing "universal" CANbus interfaces for aftermarket equipment can be daunting and expensive, and is usually cost-prohibitive for basic devices like shift lights. The majority of speed and competition equipment is thus designed to take its throttle and tachometry input directly from the engine, generally by tapping into the throttle position sensor voltage and procuring a tach signal from a spark-coil, spark module, etc. However, even this approach has pitfalls. Modern ignition systems run the gamut from coil-on-plug (COP) arrangements that behave like a one-cylinder engine, DIS packs that can behave like two or four cylinder models, or spark modules with optical triggers that can behave like a five-volt distributor. Universal tachometry equipment must also cope with a wide array of pulse rates, signal types, and signal voltages. This has led to a plethora of "tach adaptors" that allow equipment designed for the old standard of "4-6-8-cylinders" to function in the modern environment. It is also worth noting that while the vast majority of cars since 1990 are equipped with factory tachometers, the data from them is often inaccessible except on the CANbus, being passed to the cluster in data form by the ECU. Pulse-driven OEM tachometers have become nearly extinct since 2008.

The characteristics of industry throttle position sensors (i.e., TPS) can generally be "captured and learned" by adjunct devices. Throttle sensors may be 12V or 5V, with a positive or negative-coefficient, but their variability is limited. Most comprise balanced potentiometers working within a voltage range that can be readily monitored by an aftermarket device. After connecting such a device to the TPS, the user generally places it in a "learn" mode, presses a button with the accelerator released in order to capture the "idle" voltage, then presses a button with the accelerator fully depressed in order to capture the wide-open (WOT) voltage. The device then needs only to "memorize" the readings in a non-volatile memory. It can interpolate the span and direction of the signal voltage for its own purposes, without needing a CAN interface to interrogate the vehicle's ECU. The NOS 15982 Dual-RPM-WOT switch shows a typical prior art WOT capture sequence.

Cruise control is another common example of an automotive device employing capture techniques. While some very recent cruise control systems actually display a set speed to the user, this is the exception and not the rule. The vast majority of cruise controls have no idea what speed they are actually set for. Instead, these cruise control systems simply capture the axle or driveshaft speed when the user presses the "Set" button, then manipulate the throttle to attempt to match and maintain that rate. The driver is unaware of the axle speed and the cruise is unaware of the set speed; they simply each correspond to the user's input. As a safety measure, cruise controls for manual transmission vehicles always have an interrupt switch on the clutch in addition to the brake, to prevent possible over-revving. Manufacturers are aware that a safe "loaded" redline on a gasoline engine is not safe when "unloaded," as when idling. Absent a clutch switch, if a driver depresses the clutch without braking when the cruise control is engaged, the "safe" throttle position for the cruising engine would turn quickly catastrophic for an engine suddenly in neutral.

Avoiding the latter type of over-revving problem while setting thresholds for aftermarket race accessories such as nitrous oxide injection systems is a goal of this invention, as detailed below.

Unfortunately, the capture technique has drawbacks when applied to tachometry. "Learning" throttle sensor voltages can be accomplished with the key on but the engine off, with no potential harm in flooring the gas pedal. Flooring the pedal with the engine running in neutral in order to "learn" an engine's redline could be disastrous, likely resulting in a damaged or destroyed engine. Trying to capture an accurate redline reading while driving (i.e., with the engine loaded) might be safe for the engine, but it is likely dangerous for vehicle and driver. It can be determined from the references cited herein that the industry has largely rejected the latter notion. Of thirty-three shift lights, RPM switches and other aftermarket performance devices from sixteen different manufacturers, only one, the Autometer 5321, attempts a capture method. Even then, the method is potentially hazardous, requiring a press-and-hold of the capture buttons, not only forcing the user to split his attention while driving, but also to maintain a steady overspeed condition while the button is held.

Safe RPM capture techniques are known to the industry, but they have been used only for diesels and only to address a unique concern. Those skilled in the art recognize that diesel engines can suffer dangerous "runaway." Having no conventional throttle butterfly to limit intake air, a diesel with fuel or lube oil puddled inside the intake will accelerate to its own destruction unless it is smothered, loaded, or both. Thus, diesel designers have contemplated numerous safeguards, most involving air gate valves to plug the engine's air supply whenever runaway is detected. Some electronic versions of these devices have utilized the practice of capture at a "given fractional RPM" in order to "learn" the runaway threshold at a safe engine speed. The Chalwyn model CSX-300, for instance, uses a fixed 20% reduction during its learn mode (i.e. a "given fraction" of 80%, or 1/1.25), while the Roda Deaco Revguard 2 offers the user a selection of reduction ratios from 10% to 50% (i.e., "given fractions" of 90%, or 1/1.11, to 50%, or ½, respectively). The low 80% and 90% ratios are practical because large diesel engines, with lower RPM speeds and generally-overbuilt components, can safely run much closer to redline when unloaded than a typical spark engine.

The method of the instant invention also results in complete independence from signal rate considerations. Because thresholds are learned dynamically when utilizing the method of the instant invention, a device using it needs only to know that operating threshold "X" should result in action "Y," with no concern for whether the actual trigger rate is 10 pulses per second or 10,000. Nor does the method of the invention even require a pulse-based signal to realize its goal of capturing potentially-unsafe RPM thresholds at safe engine speeds. It can be easily seen that such safe, lower speeds will be safe and lower no matter how they are measured, so the benefits of the invention would apply equally with tachometry taken from changes in voltage indicative of rotation speed, or from CANbus data monitored from an engine computer. The type and source of the obtained tachometry is in fact irrelevant to the invention's method, since any resulting number from any source can be subjected to mathematical reciprocation. This complete independence of tachometry source or type would make the method of the invention useful even in high-end products like the Biondo DDI-1067 shift controller, which need keys and an extensive display for other reasons, but could easily calculate a displayable RPM from capture at a known "reference" RPM, eliminating the need for user-input of ignition type or configuration and allowing display of any arbitrarily captured thresholds. The same is true for all of the tach-and-shift-light combination devices, although the utility of the instant invention to these devices is reduced since each already possesses an RPM display and is ostensibly being added to a vehicle which lacks one. This means any "reference capture" would require a shop tach or OBD scanner for the user to acquire an initial reference RPM. While this equipment is common to most amateur and professional garages, it does limit the desirability of the method for those tachs already using capture from a needle display instead of configuration switches.

U.S. Pat. No. 4,336,778 discloses an electronic, non-computerized rev-limiter for small engines with magneto ignitions. It is particularly suited for snowmobiles and motorcycles which can experience damaging engine overspeed from something as simple as a broken drive belt, which abruptly removes the engine's load. The invention's "programmability" is limited to dial settings for overspeed limits. It is presented mainly to demonstrate that the concept of damage from unloaded overspeed is well known in the art and in the automotive industry, and is taken very seriously.

U.S. Pat. No. 4,408,583 discloses an electronic, non-computerized ignition timing control for distributor-equipped engines, allowing configuration for a variety of alternative fuel types. This unit is configurable but not programmable, and relies upon pre-calculation, rather than capture or feedback.

U.S. Pat. No. 4,683,843 discloses a safety-improved NOx injection system, employing a bypass valve to prevent leakage in the main injection valve from accumulating in the intake system during standby conditions. It has little other relevance to the instant invention, but does provide a useful overview of the typical means employed in NOx injection and some of the problems therewith.

U.S. Pat. No. 4,840,157 discloses an electronic but non-computerized "launch control". It is well-understood in the art that the instantaneous extra power generated by a NOx-injected engine can be dangerous and counterproductive from a standing start. NOx which is switched on too early simply causes irrecoverable tire-spin, causing lost races and possible loss of control. The art has thus produced many schemes for delaying NOx engagement until the tires "hook up" and the extra power can be applied without wheelspin. The NOx "window boxes" described herein all have that as one of their primary aims, keeping traction until a certain RPM is reached.

U.S. Pat. No. 5,269,275 discloses a true "window-WOT" box for NOx systems. It integrates both throttle position and RPM sensing, and has settable thresholds for those and other parameters. Balanced potentiometers connected to op amps integrate the programmed voltages into gating signals U.S. Pat. No. 5,648,898 discloses an "information manager" added to a vehicle, with particular regard to systems management on large vehicles such as dump trucks. It allows selection and monitoring of many vehicle parameters, anticipating a PC or PC-like interface, and can generate code in the onboard hardware specific to the user-desired parameters.

U.S. Pat. No. 5,769,051 discloses a remote-configurable governor for speed, RPM or both. The preferred embodiment anticipated replacing the vehicle ECU with a custom unit, but by 1998 vehicles were already appearing with multiple, LAN-connected processors like ABS and BCM that would be functionally compromised in each other's absence or the ECU's.

U.S. Pat. No. 5,905,374 discloses a very high performance drag-racing tachometer with data logging capability, peak and minimum detection, and other specialized capabilities. This unit facilitates connection to a graphic printer, allowing the charting of an entire dragstrip run. The inventor did not anticipate the advent of OBD-II, with the consequent ability of racers to simply plug a laptop into the CAN port to accomplish the same ends.

U.S. Pat. No. 6,137,399 discloses a very high performance drag-racing shift light capable of storing threshold data for multiple gears. The unit incorporates a "launch delay" timer to prevent false triggering of the light prior to the race start, and provides slope analysis of incoming RPM signals to detect "short shifts" that may occur without reaching the programmed RPM thresholds.

U.S. Pat. No. 6,339,743 discloses a user-programmable ignition system with an external programmer linkable to the ECU.

U.S. Pat. No. 6,560,528 discloses a PC-programmable ignition system specifically aimed at motorcycles, encompassing a bank-angle sensor and other motorcycle-specific attributes. It is generally representative of PC-based "tuner" systems, although not interfacing via OBD/CAN like most automobile systems.

U.S. Pat. No. 7,012,514 illustrates a drag-racing "launch light" allowing a racer to keep his engine in an optimal RPM range at the starting line prior to the green light, an important factor in getting traction off the starting line without excessive wheelspin. It basically functions as an RPM window indication, little different from a NOx switch, but driving a lamp instead of a NOx system and responding to a brake, transbrake, or driveshaft speed signal to terminate its function once the vehicle is moving. It facilitates a keypad or other direct entry means for programming its thresholds.

U.S. Pat. No. 7,859,394 discloses a "smart" shift light with RGB lamps using color to integrate RPM and wheel speed indications. Configuration is PC-based and conceptually similar to the present MSD 75591 shift switch. The user can manipulate colors and thresholds, but there is no threshold capturing.

Publication US2011/0023822A1 discloses a device interposed in series between the tach signal source and an existing vehicle tachometer. The electronics connects to the vehicle ECU in order to receive signals from the vehicle's ignition system. The idea is interesting, to create a "smart" tachometer by interposing a device in series, but the descriptions of the actual interface are vague. Perhaps deliberately, since some of the contemplated connections would hardly be "plug and play" as envisioned by the inventor. Witness, "Additionally, the electronic means connects to the vehicle ECU in order to receive signals from the vehicle's ignition system." Implementation is not simple in practice. This device could perform RPM-limiting by manipulating the tach signal line, which might be possible if the tach signal came from the coil of a distributor engine, but would remain impractical, because manipulating the line as an output would preclude using it as an input, leaving the device to guess how much limitation it was applying. This device anticipates "record and playback" of RPM events using the existing tachometer as the playback device, which is a perfectly plausible idea that some present-day tachometers actually employ. The latter are all pre-configured using 4-6-8 switches or other means, and hence can simply record needle positions. It is clear that the inventor either expected this device to be preconfigured, or, more likely, intended it to generate an arbitrary pulse train to the tachometer "display" at a rate determined by the dial position, which the user could then confirm at a desired point. The device would then implement it operationally whenever the tachometer signal rate exceeded the generated one.

The non-patent literature includes voluminous prior art. For example, the Autometer model 2302 is a dial tachometer with a built-in shift light. It is fairly typical of the breed, utilizing 4-6-8 DIP switches for configuration, and an adjustment dial to set the shift RPM. The adjustment dial moves the gauge needle, then the user resets the device to store the selection. Its primary weakness is the 4-6-8 configuration, which demands an additional "tach adaptor" to work with COP or other non-distributor ignition types. A "reference capture" could remedy this and eliminate the DIP's, albeit requiring the use of a common shop tach or OBD scanner to provide the initial reference.

The Autometer model 3690 is a dial tachometer with a built-in shift light and a pair of "set" buttons used to program both the tach configuration and shift RPM. It uses the tach needle for display during both, and will configure for COP and distributorless ignitions. The configuration algorithm forces the user to determine the pulses-per-revolution for his engine and then consult a chart. A "reference capture" is not employed.

The Autometer model 3906 is a dial tachometer with a built-in two-stage shift light. It utilizes three buttons and an adjustment dial to set the configuration and shift RPM, and, like the Autometer 3690 above, can be configured for COP or distributorless systems. It also has an extra input to select whether the lower or higher threshold will trigger the light. In use, this input is usually connected to the first gear range switch signal, allowing a different shift point to be displayed in first gear than in higher gears. However, the addition of the second trigger point also adds significant complexity.

The Autometer model 5321 two-stage shift light is the only known device using a capture method, but it executes the capture at full engine speed and requires a press-and-hold of the corresponding buttons. As noted earlier, this can be a hazardous process, not only forcing the user to split his attention while driving, but also to maintain a steady overspeed condition while the redline button is held.

The Autometer model 5340 and MSD model 8952 single-stage shift lights are typical of the breed. They are unusual only in requiring an external memory to be plugged in to set the shift point. These memories generally comprise a serial EEPROM using a "1-wire" communication format, and are colloquially called "pills" in the industry. One drawback is that only select values of pills are available, so users with unique needs are out of luck. The method of the instant invention could reduce both of their needs to one button, a far less expensive onboard EEPROM, and no added configuration.

The Autometer model 6187 and QuickCar model 611-7010 digital tachometers have a built-in shift light and a four-digit x seven-segment LED display. The Autometer uses three "set" buttons, the QuickCar two, but both use pseudo-alpha characters to generate a sort of menu. Both are essentially digital versions of the Autometer 3690 above, with the only added property being recall of peak RPM.

The Autometer model 6999 is a "high-readability" digital version of the Autometer 3690 above, with an enlarged leading digit and two buttons functioning identically to the Autometer 3690.

The Autometer model 19215 is a single-stage RPM switch for shift lights, but with a small digital RPM display and three "set" buttons. It can perform as a tachometer and will handle COP and distributorless configurations, but display is not its primary use. Functionally, except for driving an external output instead of an onboard lamp, it is programmed identically to the Autometer model 6187 above and functions similarly.

The Autometer model 19217 single-stage RPM switch for shift lights, is programmed by a pill memory and limited to eight-cylinder operation. It has no display and no other function.

The Biondo model DDI-1067 shift-controller is designed to strobe the solenoids of a transmission at individually user-selected RPM's. It uses numerous LED's with a two-digit, seven-segment LCD display for programming.

The Classic Instruments SNLITE is a single-stage RPM switch for shift lights, very similar to the Autometer 19215 above but further limited to 4-6-8 operation.

The Dedenbear RPM2 is a single stage RPM switch aimed specifically at sequential shifter control in drag racers. It has no display and supports only eight-cylinder ignition configurations. Two numbered thumbwheels are used to select RPM, and it has specialized outputs for transbrake control and launch delay.

Dynatek models DSM-2 and DSM-4 are single stage shift light controls for motorcycles. RPM is selected with a bank of six DIP switches, and requires a chart plus calculation to set.

The Holley model 840007 is a display-and-menu-driven shift light. In addition to a menu for selecting ignition configuration, it has a "program mode" wherein the user can dial the displayed RPM to match the actual engine RPM. This is an actual "reference capture", however, the device uses it only as a scalar for converting an arbitrary signal rate into a displayable RPM. It then uses the latter to calculate the actual rate corresponding to the operational RPM entered by the user from a menu. Direct capturing of a trigger threshold for turning on the lamp, in fractional form or any other, is not disclosed.

The Nitrous Express 18959 is an RPM-only window switch that is typical of the breed, employing both a "turn-on" threshold and "redline" threshold to produce an RPM "window" within which the connected NOx system will operate. It uses 2 buttons and a 4-digit, 7-segment display for configuration and programming of thresholds, and requires an external relay to drive most connected systems. The programming method is simple but not at all intuitive, a sequence entered whenever the vehicle is key-on but engine-off. Tachometer configuration is limited to 4-6-8. It is worth noting that this device is operationally identical to the example device presented in the Figures herein, but it can be easily seen that the device employing the invention is simpler and far more versatile, working with any type of tach signal, requiring no expensive display, and being smaller in size despite incorporating a heavy-duty 25 A relay compared to the 18959's 3A MOSFET.

The NOS 15982 is an RPM-WOT window switch for NOx injection, similar in function to the Nitrous Express 18959 above but adding WOT capability by interfacing with the engine's TPS sensor. It similarly uses 2 buttons and requires an external relay for the connected system, but it has a pair of 4-digit, 7-segment displays. The programming method is again simple but again not intuitive. Tachometry sources, however, are extensive, from COP to 12-cylinders. It also provides a good example of methods for capturing and learning TPS characteristics typical in the industry.

Similar prior art devices of interest include the following models: Intellitronix N3012 single-stage RPM switch; Intellitronix N3210 switch; JEGS 40822 and 4082 switches; Summit SUM-830452 single-stage RPM switch; JEGS 41262 dial tachometer; Lingenfelter RPM-003 window-WOT switch; MSD 8956 and 8969 RPM window switches; MSD 8963 single-stage shift light for drag racers; MSD 75591 two to six speed shift-controller; Proform 67005 and 67007 shift lights; Shifnoid NCRPM3000 RPM switch aimed at launch control for drag racing; and the VDO 333-935 dial tachometer with a built-in shift light and four "set" buttons used to program both the tach configuration and shift RPM.

BRIEF SUMMARY OF THE INVENTION

The invention facilitates the user-initiated capture of tachometric threshold values that are important when setting certain parameters for racing and other high performance activities. The invention obviates the necessity for an engine to reach or exceed the "safe" redline RPM under load during setup. Instead, the invention allows RPM thresholds to be setup at a safe, lower engine RPM in an unloaded state, thus allowing "garage tuning" of operating threshold values that could normally only be captured safely with the engine under load.

The invention is particularly useful for capturing thresholds used by accessory control devices, such as shift lights, shift controllers, NOx controllers, and aftermarket turbo- and super-chargers, which usually lack access to the vehicle ECU and must obtain tachometry from secondary sources such as spark coils. The method anticipates the use of an observable tachometer display (existing or applied) during the "learning" process but unnecessary afterward, making any device employing it independent of the configuration, type or rate of the tachometry signal source, while not precluding calculation of displayable RPM values if a reference capture to a known displayable value is performed in addition to any threshold captures.

It is a broad object of the invention to safely capture RPM thresholds used by spark engine control devices, especially adjunct devices employing thresholds near or above "redline" of an engine, without the need to drive the vehicle or otherwise load the engine.

It is another broad object of the invention to simplify setting of such thresholds by employing dynamic capture instead of static data entry.

It is a related object of the invention to provide a simplified system wherein as little as a single button and single indicator will suffice to capture any single RPM threshold, obviating the need for multiple switches, keyboards, displays, etc.

It is another important object of the invention to downsize and down-cost the hardware needed to set such RPM thresholds A related object is to simplify the process of setting RPM thresholds.

It is another basic object of the invention to provide a system inherently independent of the configuration, type or rate of the tachometry signal source, allowing a user broad latitude in choosing which of the many RPM signal sources on a modern engine to employ.

It is a related object of the invention to obviate the need for manually configuring the tachometry source, eliminating additional switches, keyboards, displays, etc.

These and other objects and advantages of the present invention, along with features of novelty appurtenant thereto, will appear or become apparent in the course of the following descriptive sections.

BRIEF DESCRIPTION OF THE SEVERAL VIEWS OF THE DRAWINGS

In the following drawings, which form a part of the specification and which are to be construed in conjunction therewith, and in which like reference numerals have been employed where practicable to indicate like parts in the various views:

FIG. 5A is a code section from the firmware in the device of FIG. 1A showing the use of reciprocation;

FIG. 5B is a software flow chart showing the use of reciprocation in the device of FIG. 1A; and, FIG. 6 is a representative view of two signal sources occurring on an engine running at 3000 RPM, that could be sensed and utilized by the invention.

DETAILED DISCUSSION OF THE SEVERAL VIEWS OF THE DRAWINGS

Definitions

Because certain terms in this document may have different meanings outside the context of the instant invention, the following definitions are observed here and without:

RECIPROCAL/RECIPROCATION: While the instant invention deals with automotive concepts, "reciprocal" is not used in this document in the sense of a reciprocating engine. It is instead used in the mathematical sense, two terms which if multiplied by each other equal 1. Thus, 2 is the reciprocal of ½, 4 of ¼, etc. It will be appreciated by those skilled in the art that engine revolutions are a function of time and can be measured and manipulated as either a frequency (number of signals per a given interval) or an interval (time between successive signals), with the two having an inverse mathematical relationship. Which form is applied in practice by a particular device is purely up to the designer, but it should be plain to those versed in the art that the terms of reciprocation will also be inverse, depending which form is used. "Proportion" versus "inverse proportion" are common terms reflecting reciprocal values.

RPM: The angular speed of a rotating device expressed in full rotations per minute. It will be appreciated by those skilled in the art that virtually all such measurement in automotive equipment is pulse-based, with a certain number of pulses per full rotation being produced by a given signal source on a given engine or driven shaft. It will thus also be appreciated that the relationship between rotation time (the interval between pulses) and RPM is inverse, a higher RPM equating to a proportionally shorter pulse interval. Since virtually all machine controls which measure RPM capture the time between pulses or the number of pulses within a fixed interval, using or translating that information into a usable speed indication, the term "RPM" as used herein will be generic for speed of rotation, but may reference the higher speed, the faster pulse rate, or both, depending on the context. It may also reference non-pulse based indications of rotational speed such as changes in a rotation-induced voltage, or rotation speed data collected indirectly, such as CANbus data obtained from an engine computer.

MAXIMUM SAFE RPM/REDLINE: The maximum recommended rotational speed for a given engine, determined by the engine manufacturer or builder and usually represented as "redline" on a tachometer, above which engine damage may occur. This speed always presumes that the engine is "loaded"; i.e., propelling the vehicle or driving a workload. The maximum safe speed for an engine in neutral (i.e., decoupled from its load) is not generally specified, but in gasoline engines, it is always much lower than the manufacturer-specified redline.

CAPTURE: As used in this document, "capture" indicates a "snapshot" of machine data measured at a given moment in time, generally in direct response to a user input or other specified set of conditions. The snapshot data is generally stored for later calculation or action. "Raw" capture or "raw" data refers to the unprocessed result of a capture operation, such as a timed interval between spark pulses. Such results may be used as-is by a control system or adjusted for various purposes, such as the reciprocation employed by the instant invention to calculate a "scaled" operating threshold.

THRESHOLD: For purposes of the instant invention, a "threshold" is a specified rotational speed above or below which some action should occur. It is generally a "captured" value measured in response to a user input, at a time or under circumstances determined by the user. As used herein, the term "raw" threshold refers to the instantaneously captured rotation rate "taught" to a device by a user; "operating" threshold refers to the calculated rotation rate at which the same device will actually execute its function once taught.

Discussion of the Figures

Figure 1A:
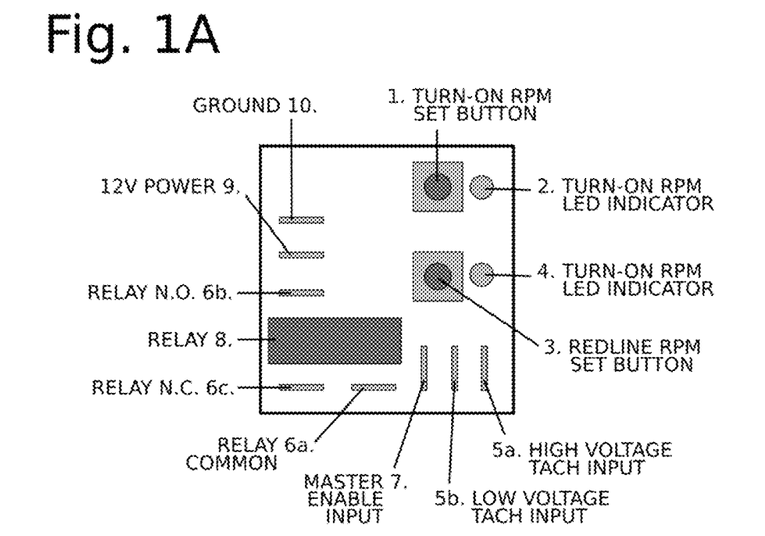
FIG. 1A is a diagrammatic view of an actual "RPM-only window switch" employing the teachings of the invention.

FIG. 1A shows a connection plan-view for a working RPM-Only Window Switch employing the method of the invention. These devices are most commonly connected to a nitrous injection (NOx) system and use two operating thresholds, a lower or "turn-on" value above which the NOx injection is enabled, and an upper or "redline" value above which the NOx is disabled. Onboard relay 8 is a heavy duty Fujitsu FTR type, sufficient to drive all but the largest NOx and fuel solenoids without help. The device requires 12 VDC power to pins 9 and 10 like any automotive accessory, and has alternative tachometer inputs 5b and 5a for low and high-voltage sources. The latter pin is high impedance and equipped with clamping to permit signals such as coil pulses, which may top 350V, to safely reach the microcontroller (uC). However, both pins arrive internally at the same uC port, the user simply selects whichever pin is appropriate when wiring the device. Pins 6a, 6b and 6c are connected to the secondary side of onboard relay 8, providing the user with complete liberty to control either power or ground to the connected device, using either normally open (N.O.) or normally closed (N.C.) logic. The Master Enable (ME) pin 7 permits operation of the relay when grounded and inhibits operation when open or connected to power. This is especially important with regard to NOx installations, whose users often drive home in the same car they race at the track. The "Turn-on RPM Set" button 1 and "Redline RPM Set" button 3 serve dual purposes, as will be shown in FIG. 3. Each serves to signal the uC to enter "Learn Mode" for the corresponding parameter when first held, then serves again to signal the uC to capture the instantaneous tach signal rate when the user is ready. The corresponding LED indicators 2 and 4 serve three purposes, acting in Learn Mode to confirm that the device is ready for capture, providing confirmation of the captured thresholds whenever the Master Enable is off, and providing confirmation of relay status when the ME is armed in normal operation. The device firmware employs a "given fraction" of 2 for purposes of implementing the instant invention.

Figure 1B:
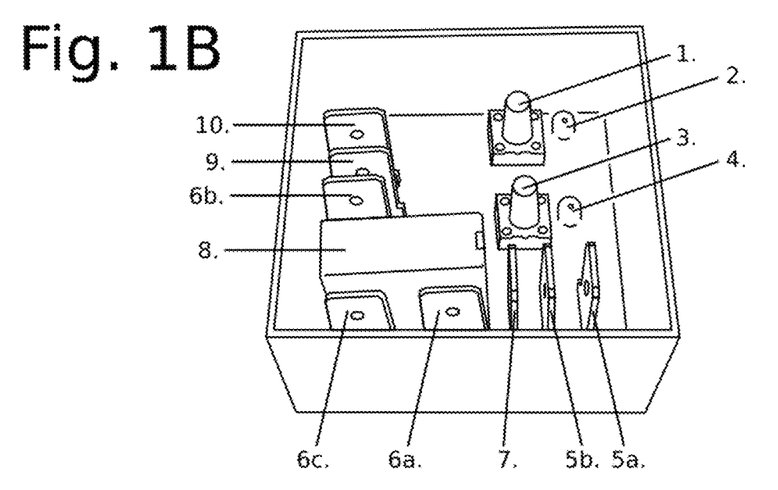
FIG. 1B is an isometric view of the RPM switch of FIG. 1A.

FIG. 1B is an isometric view of the RPM switch of FIG. 1A. For clarity, identical numbering is used. The actual size of the best mode unit pictured is 1.6×1.6×0.8 inches.

Figure 2:
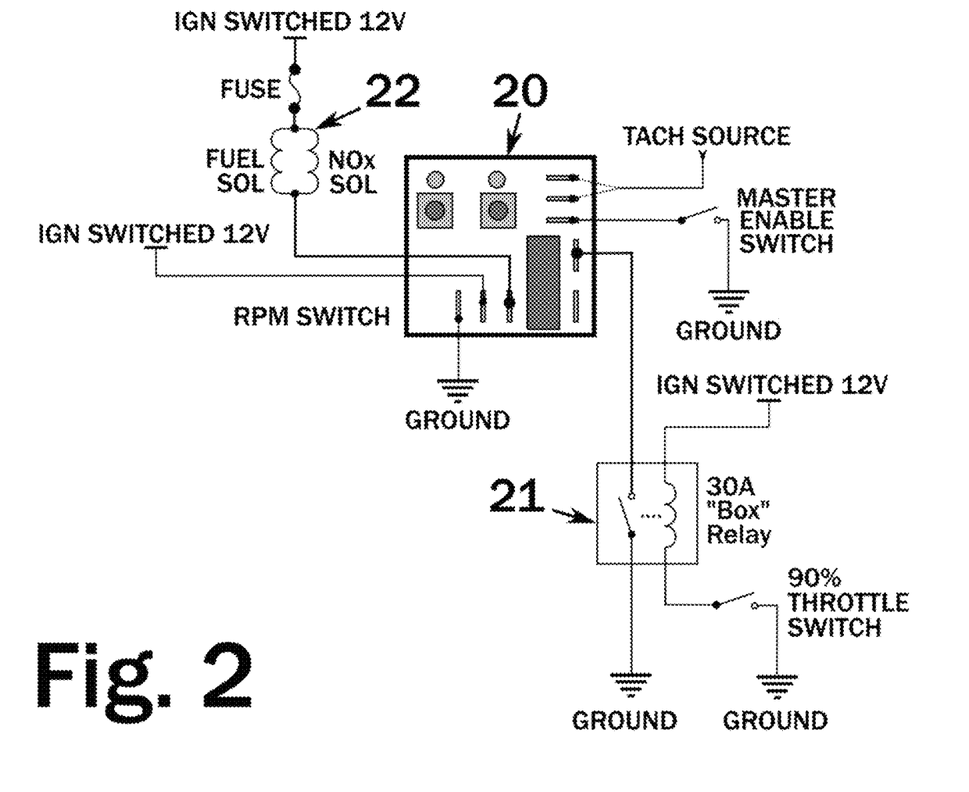
FIG. 2 is a schematic representation illustrating wiring of the device of FIG. 1A in a typical NOx system.

FIG. 2 is a schematic representation of the device if FIGS. 1A and 1B, showing it employed with a typical NOx system. Because the relay in the RPM Switch 20 and the WOT (90% Throttle) Relay 21 are both normally open and wired in series to one another, both must be active for the NOx Solenoids 22 to activate.

Figure 3:
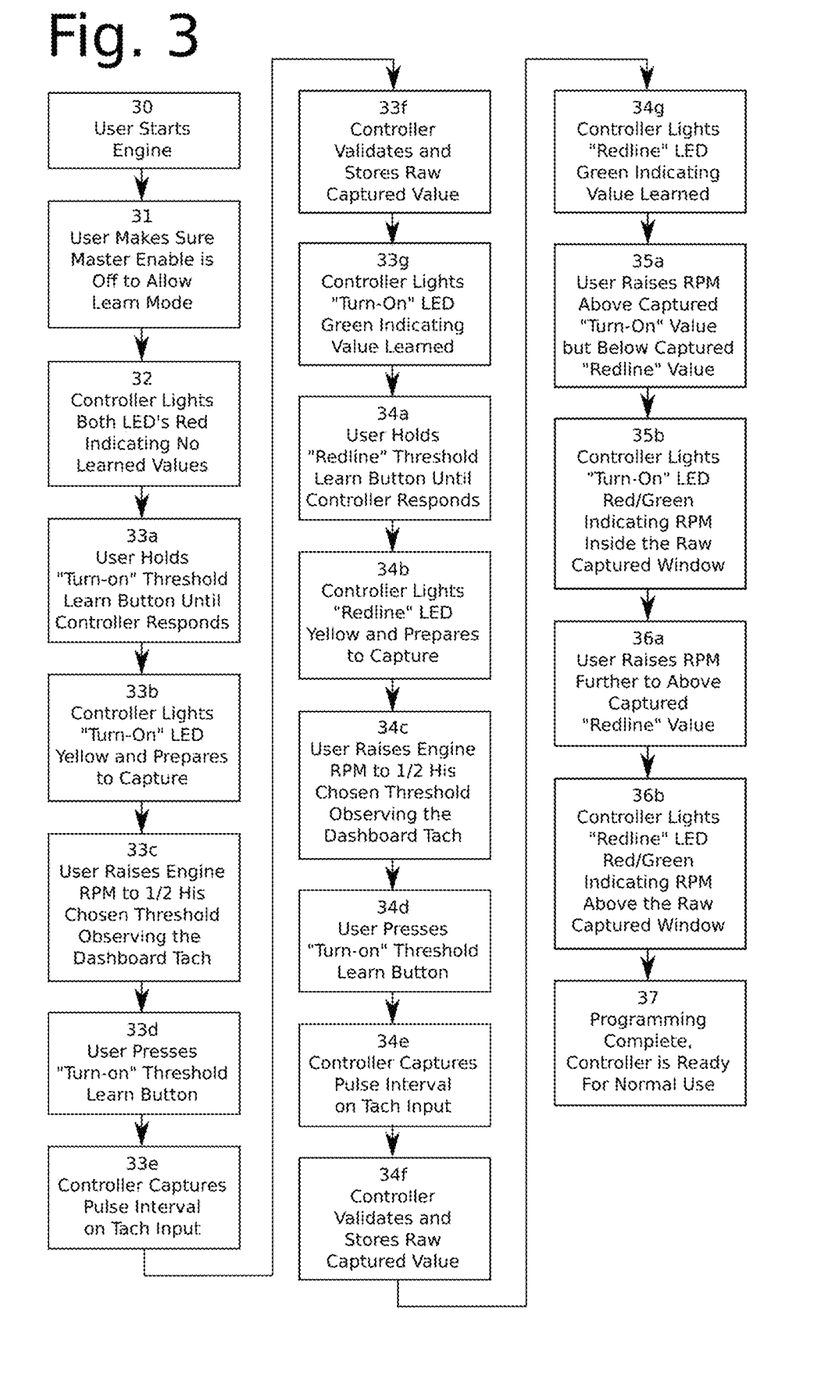
FIG. 3 is a block diagram showing the method by which the device in FIG. 1A captures thresholds.

FIG. 3 shows a method in block form which a typical user would follow to set thresholds for the RPM Switch in FIG. 1A following installation. The user starts the engine 30 and makes sure the Master Enable (ME) is disabled 31, permitting the Switch to enter a learn mode. Having no valid thresholds yet, the Switch uC turns both of the status LED's red 32 to indicate it cannot operate normally. The user first teaches the Switch the "Turn-on" threshold, initiating learn mode 33*a* by holding down the Turn-on Threshold Button 1 (FIG. 1A) until the Switch responds by changing the associated LED to yellow 33*b*, indicating it is prepared to capture. The user then prepares by elevating the engine RPM in step 33*c* to ½ the RPM at which he wants the device to turn on the relay in operation, observing the dashboard tachometer (or a temporarily applied tachometer if the vehicle lacks one). When RPM is steady at the right level, the user executes capture in step 33*d* by again pressing the Turn-on Threshold Button. This causes the Switch uC to measure, validate and store the pulse timing on tachometer port 5*a* or 5*b* (FIG. 1A) in step 33*e* and 33*f* at the instant the button is pressed. Having stored a valid Turn-on threshold, the Switch turns the associated LED green 33*g*. The Switch is actually usable at this point if the user does not wish to program a Redline threshold, for instance, if he was using the device to drive a shift light and not a NOx system, and thus had no need to turn the relay off above the shift point.

Figure 4:
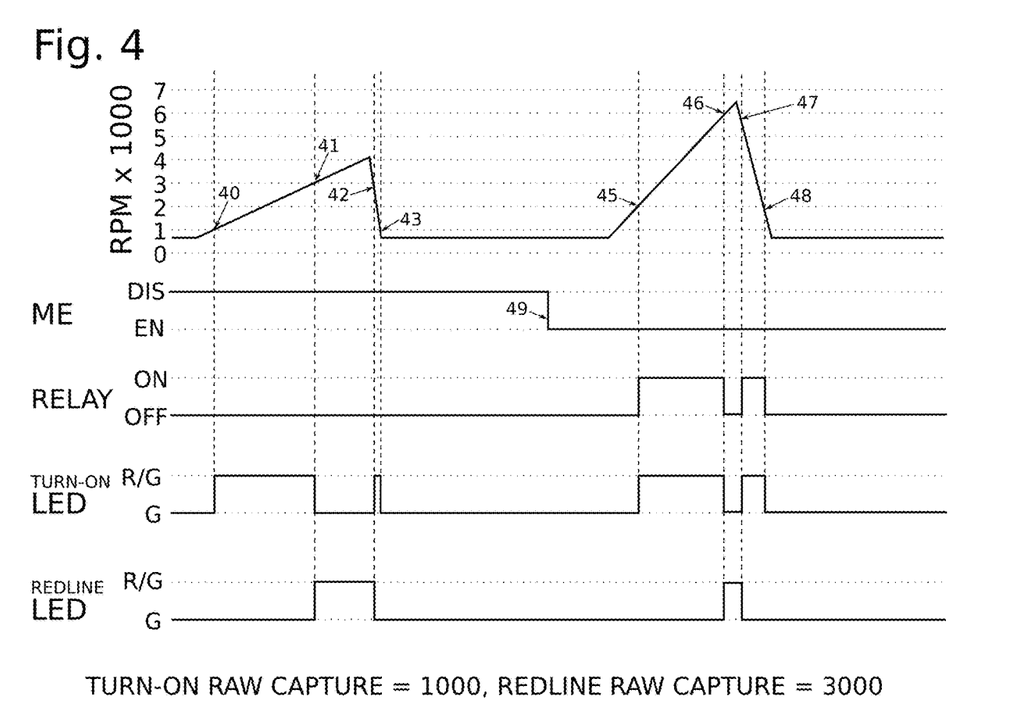
FIG. 4 is a graph showing how the output relay and LED's of the device in FIG. 1A behave after thresholds are set.

To capture a Redline threshold, the user proceeds to steps 34*a-g*, repeating the same steps as above but using the Redline Threshold Button 3 (FIG. 1A) instead of the Turn-on button 1. Both LED's will be green when finished, indicating the Switch has a valid RPM window within which it will activate the relay when enabled. The user can now confirm the captured thresholds by manipulating the throttle with the Master Enable (i.e., ME) switch (FIG. 2) which is still disabled in steps 35*a-b* and 36*a-b*. The Switch will flash each LED red/green in turn as each captured threshold is reached and exceeded, 40-41 (FIG. 4). If the user is satisfied with the activation/deactivation points, the Switch is ready for use.

FIG. 4 shows a multi-signal graph demonstrating how the output relay and LED's of the RPM Switch in FIG. 1A behave after thresholds are set. Behavior is different depending whether the Master Enable (ME) is disabled (high) or enabled (low). This transition occurs at 49 in the graph. Referring to the left of the drawing, the engine enters idling at around 750 RPM. Both of the Switch LED's are solid green, indicating both thresholds are already stored and the Switch is ready for use. For purposes here, the graph assumes that the user entered a raw "Turn-on" threshold of 1,000 RPM and a raw "Redline" threshold of 3,000 RPM. With the ME disabled, the LED's will simply confirm at 40 and 41 the values as they were captured, allowing the user to check or verify the Switch's memory. When engine RPM rises to 1,000 at 40 the Turn-on LED begins flashing red-green, then returns to green when the rising RPM crosses the 3,000 "Redline" value at 41. Simultaneously, the Redline LED begins flashing red-green, indicating RPM is above its threshold. Note that this particular Switch employs hysteresis of 1 part in 16 when RPM is falling, so the corresponding turn-off points for the LED's 42 and 43 are slightly lower than the turn-on points when rising. This is primarily to prevent relay bounce if the throttle steadies at or near a threshold, so it of course also applies to the relay when ME is enabled, not just the LED's. Referring to the right side of the graph, with ME enabled, it can be seen that the Switch applies its "given fraction" of 2 to the captured thresholds. The relay, along with the Turn-on LED, changes state as the RPM's cross 2,000 (double the raw threshold) at 45, then the relay shuts off and the Redline LED changes state as the RPM's continue to rise past 6,000 at 46. The sequence again repeats at 47 and 48, with hysteresis, as the RPM's fall. Note that as shown in FIG. 2, a throttle or TPS switch of some sort is always employed in series with any RPM switch in a NOx system. Throttle switches are usually set for 90% of WOT, so even though the window relay is active with falling RPM's, the NOx injection will remain off because the driver's foot is off the accelerator.

FIG. 5A is a code section from the RPM Switch in FIG. 1, showing how reciprocation is employed after threshold capture. It corresponds to steps 34*b*~34f of FIG. 3, the "learn" routine for the Redline Threshold. The code is in standard Microchip PIC16 assembly language, running on the well-known PIC16F684 platform (8-bit). For clarity, section 50 at the top simply defines RAM used in the routine that follows. The program architecture employs continuous, interrupt-driven capture of RPM data, with the 16-bit results being placed in RAM locations IN1:IN0. Thus, that location always contains the latest RPM measurement available. Location WLL1:0 contains the "Turn-on" threshold value, WLH1:0 contains the "Redline" threshold. These are RAM copies, initially retrieved from the non-volatile onboard EEPROM whenever the Switch is reset or power is applied. Both thresholds take the same 16-bit form as the tachometry data IN1:0, so they can be compared directly to the tachometry timer. Threshold values are set to 0 if no valid value has been captured. This firmware's architecture performs reciprocation as soon as capture occurs, storing the data in already-reciprocated form. This is of course an arbitrary programming choice, the data could just as easily be stored in both raw and reciprocated form, or stored as-captured and reciprocated as needed. Note that the architecture performs RPM measurement using pulse-interval timing and not frequency, so reciprocation is by means of division (half the interval equaling double the frequency). Both "learn" routines are entered by means of a held button, which will likely still be depressed on entry. Like the RPM data collection, buttons on this device are monitored and updated elsewhere, so this routine simply calls on data returned by the button handler. Referring now to the figure, section 51 executes only once on entry, flagging the LED handler to turn the Redline Threshold LED yellow, indicating readiness for capture. The HouseKeep subroutine is invoked wherever the program loops to await other action, updating the LED's, button data, etc. Section 52 consists of two such closed loops, the first simply awaiting release of all buttons, the second awaiting a new press of the "Redline" button. Capture occurs upon the latter, section 53 latching the latest tachometry from IN1:0 by transferring it to WLH1:0 for work and validation. Section 54 then checks for a zero value (no tach signal) and aborts if so, zeroing both capture values. Section 55 applies the reciprocation, using a 2-divide of the captured value WLH1:0. In binary math, this is more easily accomplished with bitwise rotation to the right than repetitive subtraction. To preserve accuracy, the shifted result is rounded up according to the discarded bit. The result is a pulse interval that is twice as fast, and an RPM threshold twice as high, as the one just captured. Since this is in exact inverse proportion to the user's pre-calculated RPM using the given fraction listed in the instructions, which produces a capture RPM twice as slow, the result is that the device has stored the threshold the user wants. Section 56 completes validation, invoking a subroutine HminusL to make sure the newly captured Redline value is smaller (higher RPM) than any existing Turn-on value. If not, both thresholds are zeroed at 57. The logic continues to section 58 regardless of whether the new value passes validation, since both learn routines are non-reentrant (they can only end in a device reset). Section 58 merely awaits the release of the button before proceeding to 59, which writes two copies of the new value (or zeroes, if validation failed) to the onboard EEPROM. It then locks in a loop which causes the watchdog timer to reset the processor 18 mS later. This happens too quickly to be perceptible to the user, but causes any new EEPROM values to be fully reloaded and reevaluated before execution continues.

Figure 5B:
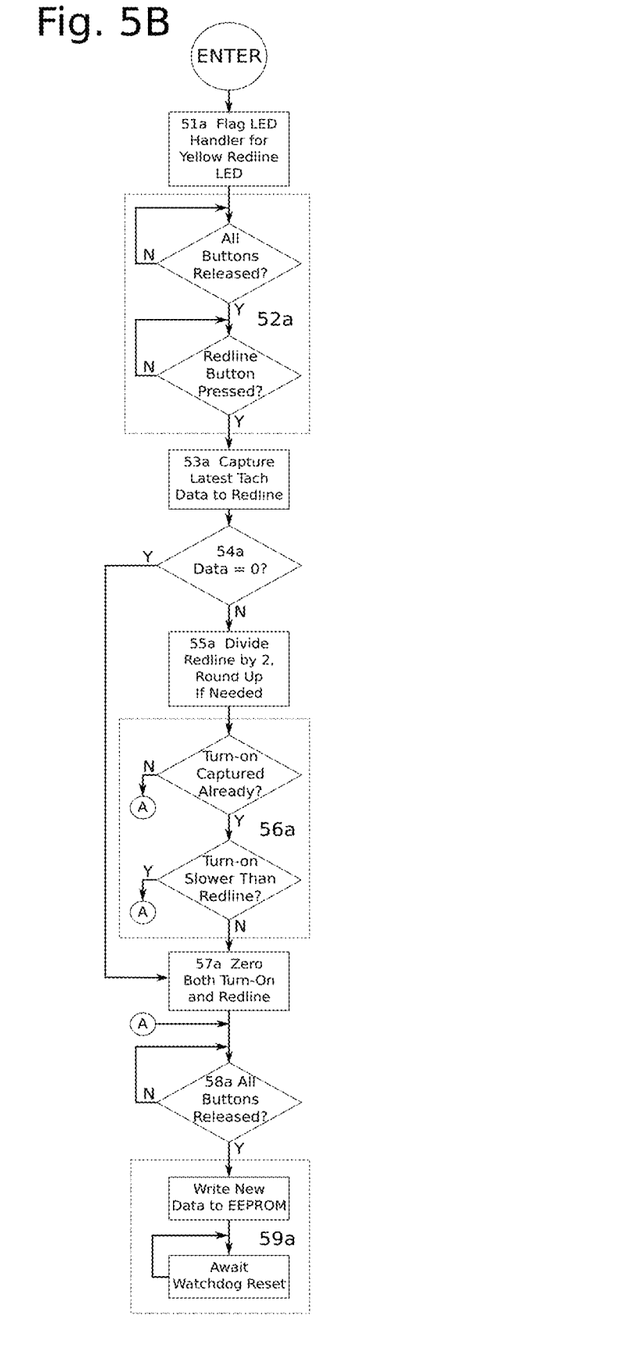

FIG. 5B is a programming-style software flowchart corresponding to the code shown in FIG. 5A, illustrating Microchip PIC16 language and architecture. Reference numerals in this view correspond to similarly numbered code sections in FIG. 5A. but with the suffix "A" added.

Figure 6:
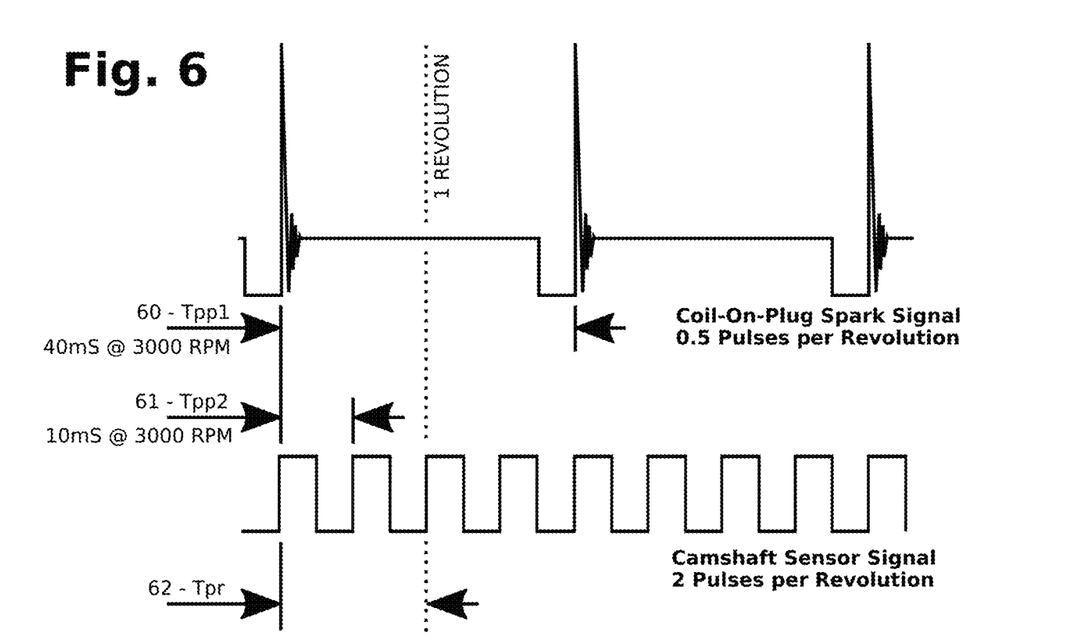

FIG. 6 shows an "oscilloscope" drawing of two signal sources on a theoretical 4-stroke engine running at 3,000 RPM, to illustrate how the method of the invention makes any device employing it independent of signal rate considerations and free of tachometry source configuration for a user. The Switch of FIG. 1A employs a 16-bit timer with a resolution of 4 microseconds (uS), allowing it to clock pulse-to-pulse intervals up to 0.262 seconds in duration. The timer is reset and the interval captured on each rising edge of an input signal. Let us assume that the user wishes to set a Redline threshold of 6,000 RPM for the device, which is below his theoretical engine's redline when driving (coupled to the wheels and loaded), but an unsafe speed at which to operate it in neutral (decoupled from the wheels and unloaded). Having read the instructions, the user is thus observing the car's tachometer and running his engine at a steady 3,000 RPM (½ his desired operating threshold) to "teach" the device the correct interval for his chosen tachometry source. The top trace in the figure shows one possible choice, the spark signal from a "coil-on-plug" spark coil (COP). This signal occurs once near TDC (top-dead-center) for each cylinder on each power stroke, so it will occur once every other revolution and will be identical for each cylinder regardless of their number. The bottom trace represents the digital signal from another possible choice, a 4-notch camshaft position sensor (CMP). Because the camshaft spins at half the rate of the crankshaft, this will produce 2 pulses per crankshaft revolution. The user could connect to either one, but of course they have markedly different timing characteristics. With reference to the figure, at 3,000 RPM, the engine has a rotation period 62 of 20 milliseconds (mS), 1/(3,000/60 S)=0.02 S. With the device connected to the COP, whose period 60 is 40 milliseconds (mS), the 4 uS timer will capture a "raw data" period of 10,000 ticks (0.040/0.000004) when the user executes the capture. Connected to the CMP with period 61 of 10 mS, the same timer will capture a period of 2,500 ticks (0.010/0.000004). However, using the method of the invention, the device will function identically regardless of which source the user connected to it. The device will calculate the value for use in normal operation by applying the same reciprocal of 2 to whatever period is captured, 10,000/2=5,000 ticks for the COP trigger, or 2,500/2=1,250 ticks for the CMP trigger. In each case, with the calculated threshold applied in operation, the device will execute its task at the 6,000 RPM threshold desired by the user, not the 3,000 RPM it was "taught" at. It can be easily seen that the method of the invention makes the device configuration-free from the user's perspective, while allowing him to "garage set" any desired operating threshold, no matter how high, at a lower RPM safe for his engine. For its part, the device has no need to know whether it is connected to a COP or a CMP or any other rotational signal, nor does it need to know what the threshold data rate would equate to in human terms. It needs only to collect and store the desired threshold timing according to its own, arbitrary machine-clock, then in operation apply the "given fraction" specified by its designer or user. The only "human" values involved are those observed by the user on the car's existing tachometer or other tachometry display.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A method for safely setting RPM thresholds for use by a spark-ignition internal combustion engine that is coupled or decoupled to a load, the engine characterized by a maximum safe RPM when loaded, and a reduced maximum safe RPM when unloaded, the method comprising the steps of:
   a. initiating engine operation;
   b. setting said engine at a pre-calculated RPM which is slower than said reduced maximum safe RPM;
   c. capturing RPM data from step "b";
   d. converting captured RPM data from step "c" into an RPM threshold that is potentially higher than said maximum safe, loaded RPM threshold by applying a preselected fraction;
   e. recording said higher RPM threshold;
   f. running the engine at high speed;
   g. monitoring engine RPM at high speed; and,
   h. when the loaded engine is thereafter run at high speed, providing a trigger signal capable of actuating connected internal or external devices in response to occurrence of said RPM threshold.

2. The method as defined in claim 1 wherein:
said connected external devices are selected from the group consisting of shift lights, shift controllers, nitrous injection controllers, turbochargers and superchargers.

3. A method for safely setting RPM thresholds in a primary or adjunct control system for a spark-ignition internal combustion engine, said engine driving or powering a load which can be decoupled; said engine further characterized by a maximum safe RPM when coupled to the load and a reduced maximum safe RPM when decoupled and unloaded; said engine further being connected to an existing or temporarily-applied tachometer which is observable to a user; said control system further utilizing an RPM threshold which may be determined by said user and conveyed to said system by means of a user-initiated raw data capture, said last-mentioned RPM threshold being potentially faster than said reduced maximum safe RPM, said system further programmed or equipped with a given fraction value known to or selected by said user, said method comprising:
   a. employing said observable tachometer to operate said engine at a pre-calculated RPM which, when divided by said fraction or multiplied by the inverse of said fraction, yields said RPM threshold;
   b. placing said system in a mode prepared for capture of RPM data;
   c. signaling said system to capture said RPM data from said engine;
   d. converting said captured RPM data from said substep "c" into said RPM threshold by applying said given fraction;

e. storing and monitoring said RPM threshold;
f. running said engine at high speed; and,
g. providing a control signal when said RPM threshold is exceeded.

4. The method as defined in claim 3 further comprising the step of switching on at least one preselected accessory control device with said control signal, wherein said preselected accessory control device is selected from the group consisting of shift lights, shift controllers, nitrous injection controllers, turbochargers and superchargers.

5. A method for safely setting RPM thresholds for use by a spark-ignition internal combustion engine that is coupled or decoupled to a load, the engine characterized by a maximum safe RPM when loaded, and a reduced maximum safe RPM when unloaded, the method comprising the steps of:
  a. initiating engine operation;
  b. setting said engine at a pre-calculated RPM which is slower than said reduced maximum safe RPM;
  c. capturing RPM data from step "b";
  d. converting captured RPM data from step "c" into an RPM threshold that is potentially higher than said maximum safe, loaded RPM by applying a pre-selected fraction;
  e. recording said RPM threshold;
  f. comparing engine RPM to said said RPM threshold; and,
  g. providing a control signal capable of actuating connected internal or external devices when engine RPM exceeds said RPM threshold.

6. The method as defined in claim 5 further comprising the step of recording data from step (c).

7. The method as defined in claim 5 wherein said internal and external devices are selected from the group consisting of shift lights, shift controllers, nitrous injection controllers, turbochargers and superchargers.

\* \* \* \* \*